Oct. 1, 1957 W. F. KNAUERT 2,808,468
MAGNETIC INSERT EARPHONE AND INSERTS THEREFOR
Filed Feb. 7, 1952 3 Sheets-Sheet 1
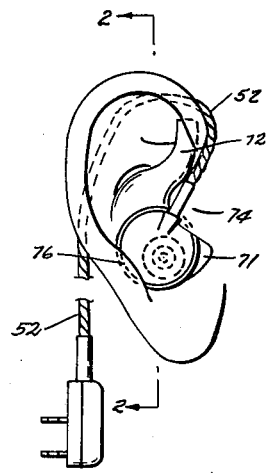
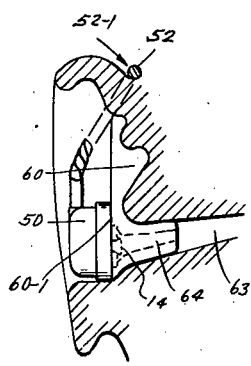
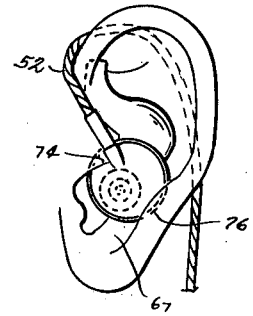
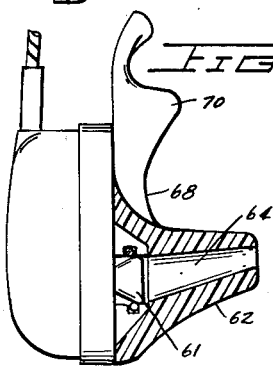
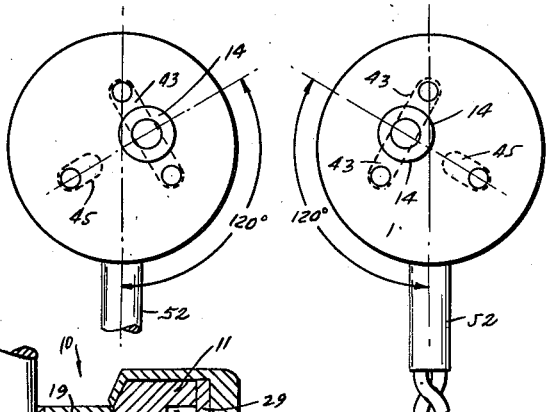
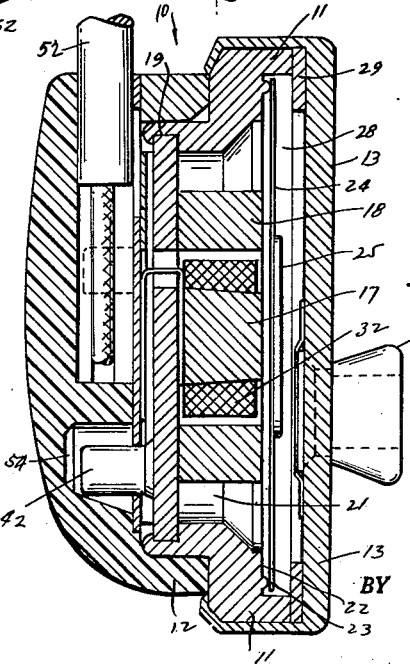
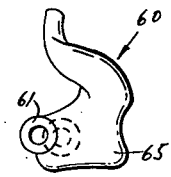
INVENTOR.
WILLIAM F. KNAUERT
BY
Greene, Pinckes & Durr
ATTORNEYS.

Oct. 1, 1957  W. F. KNAUERT  2,808,468
MAGNETIC INSERT EARPHONE AND INSERTS THEREFOR
Filed Feb. 7, 1952  3 Sheets-Sheet 2
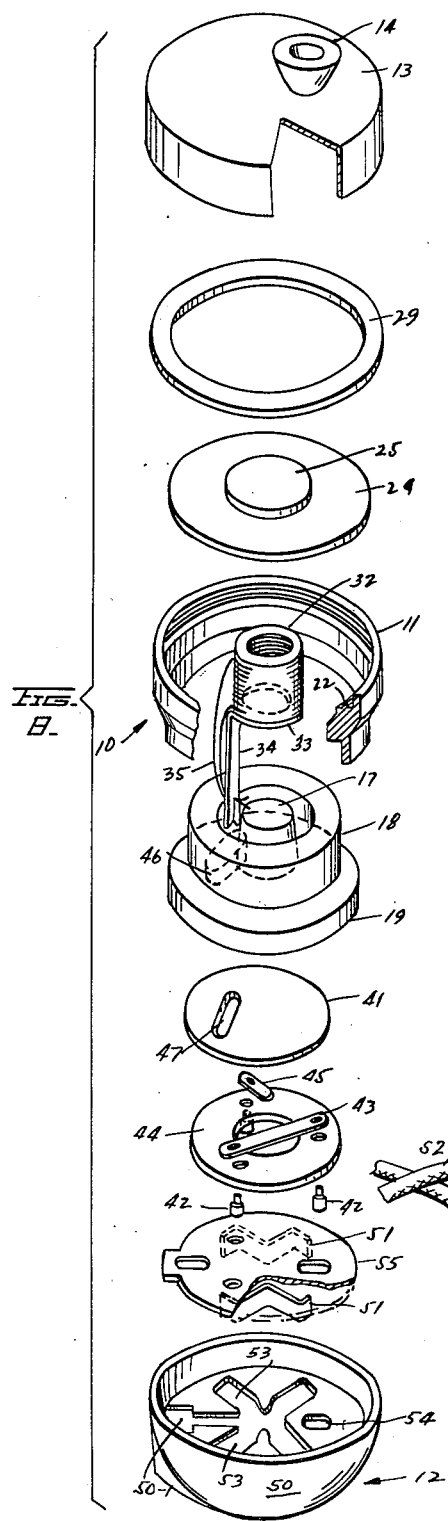
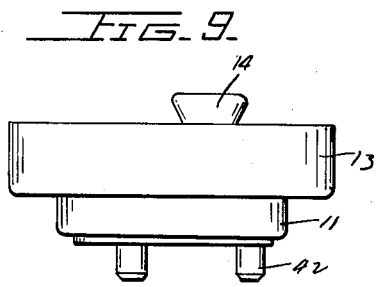
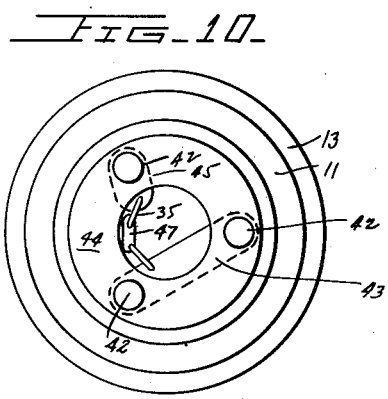
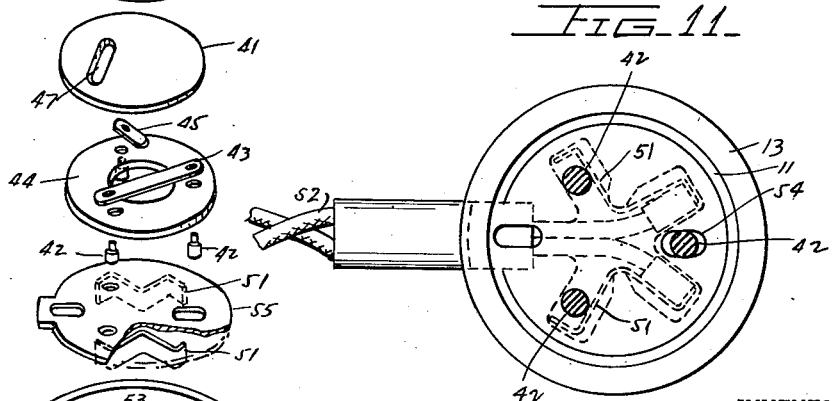
INVENTOR.
WILLIAM F. KNAUERT
BY
ATTORNEYS Oct. 1, 1957 W. F. KNAUERT 2,808,468
MAGNETIC INSERT EARPHONE AND INSERTS THEREFOR
Filed Feb. 7, 1952 3 Sheets-Sheet 3
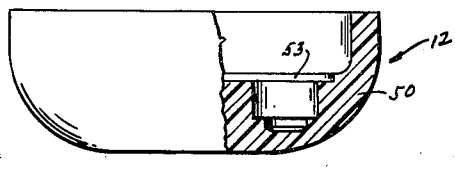
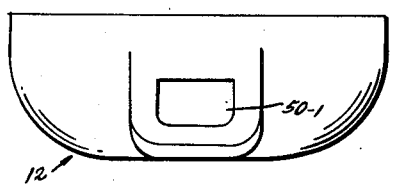
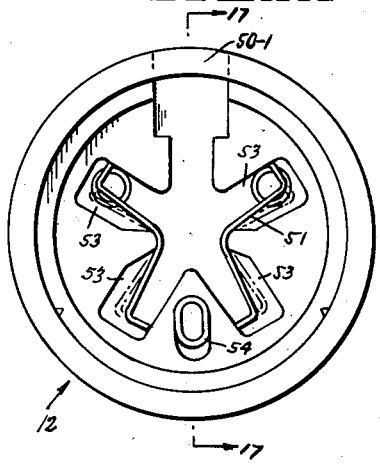
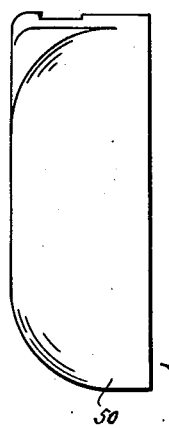
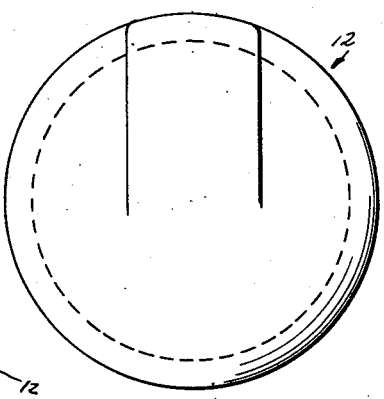
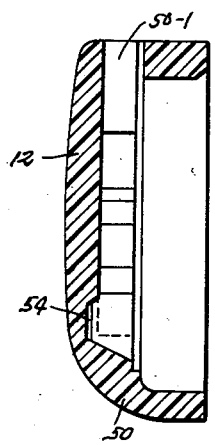
INVENTOR.
WILLIAM F. KNAUERT
BY
Greene, Pineles & Dunn
ATTORNEYS

United States Patent Office 2,808,468
Patented Oct. 1, 1957

2,808,468

MAGNETIC INSERT EARPHONE AND INSERTS THEREFOR

William F. Knauert, Yonkers, N. Y., assignor to Sonotone Corporation, Elmsford, N. Y., a corporation of New York Application February 7, 1952, Serial No. 270,391

6 Claims. (Cl. 179—107)

This invention relates to insert earphones of the type used in hearing aids, and to the combination of such insert earphones with an ear insert molded to conform to and fit the ear and the adjoining inlet portion of the ear canal and serving as an acoustic seal and support for the earphone.

Among the objects of the invention are a molded ear insert conforming to the shape of the ear having such an extremely shallow earphone coupling portion that when combined into a unitary structure with a detachable earphone coupled thereto, the combined insert and earphone structure will substantially in its entirety be confined within the outer ear cavity without substantially projecting beyond the level of the ear helix.

Another object of the invention is an earphone having an eccentrically positioned sound outlet duct through which it is detachably coupled to a molded ear insert conforming to the shape of either the right or the left ear, and provided with a selective cord coupling connector whereby the cord may be selectively led from the earphone in a direction over the upper ear body junction portion to either the right or the left ear.

Among the objects of the invention are also various novel construction features which greatly simplify the manufacture of a highly efficient tiny earphone on a large scale production basis.

The foregoing and other objects of the invention will be best understood from the following description of exemplifications of the invention, reference being had to the accompanying drawings, wherein:

Fig. 1 is an elevational view of the right ear of a person with the earphone and its molded ear insert held in place therein in accordance with the principles of the invention;

Fig. 1A is a plan view of the earphone shown in Fig. 1;

Fig. 2 is a cross-sectional view along line 2—2 of Fig. 1;

Fig. 3 is an elevational view similar to Fig. 1 showing the corresponding elements held in the left ear;

Fig. 3A is a plan view of the earphone shown in Fig. 3;

Fig. 4 is an elevational view of the earphone with the molded ear insert coupled thereto with a part thereof in cross-section;

Figs. 5 and 6 are front and back elevational views, respectively, of the molded ear insert for the right ear;

Fig. 7 is a greatly enlarged vertical cross-sectional view of a miniature hearing aid earphone exemplifying one form of the invention;

Fig. 8 is an exploded perspective view of the earphone shown in Fig. 7;

Fig. 9 is a side view of the earphone with the cord-coupling connector cap removed;

Fig. 10 is a bottom view of the earphone shown in Fig. 9;

Fig. 11 is a plan view of the cord-coupling connector cap member of the earphone, which is coupled to the bottom side of the earphone shown in Fig. 9;

Fig. 12 is a cross-sectional view of a portion of the cord-coupling connector cap along line 12—12 of Fig. 14;

Fig. 13 is a front view of the cord-coupling connector cap with the cord removed;

Fig. 14 is a plan view of the cord-coupling connector cap, showing the spring metal contact elements exposed therein;

Figs. 15 and 16 are a side and top view, respectively, of the cord-coupling connector cap with the cord removed; and Fig. 17 is a cross-sectional view of the cord-coupling connector cap along line 17—17 of Fig. 14.

For a number of years past a great many deafened persons preferred to use what is known as out-of-sight earphones rather than wear an earphone projecting outwardly from the ear and carried by a molded ear insert made by known dental molding techniques so as to conform to the convolutions of the outer ear and provide an acoustically sealed sound duct connecting the ear canal of the user to the sound outlet of the earphone worn out of sight or hidden under his clothing.

Such out-of-sight ear piece usually consisted of a shallow ear insert molded to conform to the ear of the user and confined between the tragus and helix portions of the ear, and a relatively narrow plastic tube extending from such ear insert and looped around the upper junction of the ear to the head for providing a connection between the ear insert and the earphone usually carried under the clothing of the user. Because the sound had to be transmitted from the earphone through a relatively long plastic tube by way of the molded ear insert, to the ear canal, some of the desirable high frequencies of the transmitted sound waves were suppressed and the reproduction of speech delivered to the user thus impaired. Notwithstanding these deficiencies connected with the use of out-of-sight earphones, a large percentage of the deafened preferred to forego the advantages secured by direct coupling of the earphone to the ear canal in order to make their hearing impairment less conspicuous.

One phase of the present invention is based on the concept of providing a combination of a subminiature earphone carried by a molded ear insert conforming to the convolutions of the ear having a sealed sound transmitting connection from the earphone to the ear canal of the user—such combination to be small enough and shallow enough so as to be confined between the tragus and helix portions of the ear in the same manner as the heretofore generally used out-of-sight ear inserts—while at the same time providing cord connections to the earphone that may be trained or guided over the upper junction of the ear to the head. in cases where the right or the left ear has to be fitted to the earphone in order to meet the hearing deficiency of different deafened individuals.

Figs. 1 and 2 show the right ear of a user fitted with a combination earphone unit of the invention. The combination earphone unit comprises an earphone 5 carried by a molded ear insert 6 and forming with it an extremely compact shallow unit, the outermost portions of which are shown confined between the tragus 74 and the helix 76 of the ear. The sound outlet duct 14 of the earphone 5 is eccentrically positioned or offset from its axis and is shown connected through a duct passage 64 of an ear canal duct 62 fitting within and sealing the ear canal 63 of the user. A thin supply or energizing cord 52 extends from a terminal member 50 of the earphone arranged so as to permit the supply leads or cord 52 to be guided or trained over the upper junction portion of the ear to the head and along behind the ear and hidden thereunder directly to the terminal elements of the hearing aid amplifier which supplies to the earphone the amplified electric output of the hearing aid microphone.

It will be noted that the combination earphone-insert unit fitted to the right ear of the user as seen in Figs. 1 and 2 is confined within the ear to at least the same extent as the highly popular prior art out-of-sight ear inserts, and the supply cord 52 of the earphone 5 shown is even more inconspicuous than the plastic tube which had to be used with the out-of-sight ear inserts for transmitting thereto the sound from the earphone carried under the clothing of the user.

In accordance with the invention the same earphone 5 with its supply cord terminal member 50 may be also combined with a corresponding cooperating ear insert of the invention molded to conform to the left ear of the user in the manner indicated in Fig. 3 so as to be confined between and under the tragus and the helix portions of the left ear of the user and thus be at least as inconspicuous as an out-of-sight ear insert fitted to the left ear of the user and supplied with the sound waves through a tubing connection to an earphone carried hidden under the clothing of the user.

There will now be described in detail one form of an earphone of the invention suitable for combination with a molded ear insert into an earphone-insert unit to be fitted to the right or left ear of the user.

Figs. 7, 8, and 9 to 16 show one form of an electromagnetic insert earphone 5 of the invention. It comprises an electro-magnetic driving structure 10 having its magnetic elements supported by a circular non-magnetic metal frame 11, of brass, for instance. The driving structure 10 is bounded at one side by a molded cord coupling connector cap wall 12 and at the other side by a circular cover wall 13 containing the sound outlet duct 14. The magnetic elements of the electro-magnetic driving structure 10 comprise a substantially cylindrical central magnetic pole piece 17 and a surrounding substantially cylindrical ring-like outer magnetic pole member 18 held in their concentrical relationship by a substantially circular concentric magnetic junction or yoke plate 19 affixed thereto.

In the commercial construction of receivers of the type shown in Figs. 7 and 8 the outer cylindrical magnetic pole member 18 is formed of permanent magnet material, such as molded Alnico material. The cylindrical pole piece 17 and the circular yoke plate 19 are of soft highly permeable magnetic material. The circular periphery of the yoke plate 19 projects beyond the circular magnet 18 and is held in a cylindrical recess formed in the rear side of the frame 11. A portion of the shell-like frame wall surrounding the periphery of the yoke plate 19 is of reduced thickness and is crimped or bent thereover, thereby affixing the yoke plate 19 with the pole piece 17 and the driving magnet 18 secured thereto in properly aligned position within the frame 11.

The circular region of the frame 11 which surrounds the cylindrical magnet 18 is of larger diameter than the magnet 18 so as to provide a substantially circular acoustical cavity space 21 extending around the magnet 18.

The laterally projecting circular region of the frame 11 has a seating surface 22 which has formed thereon a continuous, generally circular, outwardly curved seating ridge 23 against which a peripheral region of the inner side of a vibratory diaphragm 24 is seated. The diaphragm 24 is formed of spring sheet metal and has a central part arranged to serve as a magnetic armature for co-operation with the pole surface portions of the magnetic elements 17, 18, 19 so that the diaphragm 24 shall be vibrated by the vibratory magnetic forces exerted thereon by the electro-magnetic driving structure 10. The seating ridge 23 has a curved seating surface designed so that the diaphragm 24 will make contact with the ridge 23 throughout its entire vibratory range. The central armature portion of the diaphragm 24 has secured thereto an additional circular armature element 25 of highly permeable magnetic material for carrying all the magnetic flux passing from the magnetic elements 17, 18, 19 of the driving structure 10 without substantially saturating the central armature portion 25 of the diaphragm 24.

The magnetic elements 17, 18, 19 are secured to each other by spot welding or soldering. The central portion of the additional armature 25 is affixed to the diaphragm 24 likewise by spot welding or soldering.

The outer side of the diaphragm 24 is enclosed by a cap-shaped circular cover wall 13 having a circular rim which fits over the frame 11 and is acoustically sealed thereto to form with the diaphragm 24 an acoustic chamber 28 from which the generated sound waves are transmitted through its sound outlet duct 14. In the form shown, the cover wall 13 is provided with a circular rim fitting over the outer surface of the frame 11, the edge of the rim being crimped or bent over thereover to form a tight seal with the frame 11. A spacer washer 29, of metal, for instance, is interposed between the inner surface of the cover wall 13 and the facing outer edge of the frame 11 to adjust the volume of the acoustic chamber 28.

In the generally cylindrical space extending between the pole piece 17 and the surrounding magnet 18 is located an energizing coil 32 which constitutes the receiver winding carrying the electric variable frequency operating currents. The energizing coil 32 comprises a cylindrical hollow inside-tapered coil containing many layers of turns of gossamer-thin electrically conducting wires. Each turn is electrically insulated from the others by being coated with an insulating cement, which also acts to bind the various turns and layers together in the desired form of the coil, thus eliminating the need for a coil bobbin when winding the coil. Cemented to the rearward facing boundary edge portion of the energizing coil 32 is a thin circular washer 33, composed of an electrically insulating material such as paper. The coil washer 33 has a thin relatively stiff tail 34 projecting rearwardly from the outer edge of the washer 33 and having a length approximately twice the outside diameter of the coil 32. The stiff tail 34 has a slit which makes it possible to retain therein the gossamer leads 35 of the energizing coil 32 while assembling the various elements and securing them in their operating positions.

In the receiver of the invention, one of the difficulties encountered by the prior art in handling the gossamer leads 35 of the energizing coil 32 is overcome by the stiff coil tail 34 which serves as a needle with which the gossamer leads 35 are threaded through the electro-magnetic driving structure 10 for connecting the leads 35 to a terminal assembly 40 provided at a rear portion of the earphone. This facilitates handling of the gossamer leads 35 and thereby assures rapid and proper assembly of the energizing coil 32.

The operation of the earphone 5 is as follows: The cylindrical magnet 18 induces a constant magnetic field which passes through the highly permeable yoke plate 19, thence through the highly permeable pole piece 17, through the driving air-gap separating the diaphram 24 from the magnetic elements 17, 18, 19, and through the armature element 25 affixed to the diaphragm 24 and back across the driving air-gap to form a closed magnetic path.

A hearing aid amplifier supplies audio frequency currents, by way of the energizing cord leads 52, to the coil leads 35 of the energizing coil 32 for inducing corresponding magnetic field oscillations in the driving air-gap of the magnetic structure 10. As a result, the vibratory diaphragm 24 generates audio frequency sound waves in the acoustic chamber 28 which are conveyed by the sound outlet duct 14 into the ear of the user.

In most cases, the user of hearing aid earphones desires that the current supply leads to the earphone be led or brought out of the earphone over the channel formed by the upper junction of the ear to the head, overlying the tragus, as shown in Figs. 1, 2.

According to one phase of the invention, the earphone is formed of two detachable earphone sections namely a rearward cord section having an eccentric cord junction, and arranged for detachable coupling to the sound emitting section in two angularly displaced positions for making it possible to use the same earphone with its eccentric sound outlet duct either in the right or left ear of the user, with the supply cord brought in each case over the upper ear junction above the tragus to the rear of the head.

The rear section of the earphone is formed by the supply lead connector through which the two conducting leads of cord 52 are detachably connected to the energizing terminals of the driving coil 18 formed on the rear of the driving structure 10. In the specific form shown in Figs. 8 to 17, the driving structure 10 has at its rear side a terminal assembly 40 separated by an electrically insulating washer 41 from the yoke plate 19. The terminal assembly 40 comprises an insulating disk 44 having mounted therein three outwardly projecting metal male plugs 42 symmetrically spaced around a circle having its center at about the center of the earphone core 17, 18, 19. Two of the male plugs 42 are electrically connected to each other by a metal connecting link 43, which in turn is electrically connected to the two leads 35 of the energizing coil 32. The third male plug 42 is electrically connected to the other coil lead by another metal tail piece 45. Each terminal plug 42 is permanently affixed to the supporting disc 44 by links 43, 45 which are secured to the inner ends of the plugs 42 held in openings of the disc 44.

The stiff tail 34 of the energizing coil 32 carrying the gossamer coil leads 35 as a needle carries thread, is threaded through the aligned openings 46 and 47 in the yoke plate 19, the insulating washer 41, respectively and the two leads are connected, respectively, to the junction links 43, 45 of the opposite polarity terminal plug groups 42. Thus, two of the male plugs 42 of link 43 are electrically connected to one coil lead while the link 45 is connected to the other energizing coil lead 35. After the gossamer coil leads 35 are electrically connected, as by soldering, to the terminal links 43, 45 of the terminal assembly 40, the stiff tail 34 of the washer 33 attached to the energizing coil 32 is detached or cut off and discarded.

In the form shown, the terminal assembly 40 of the driving structure 10 is enclosed by a detachable cord-coupling connector cap 12 formed of suitably molded electrically insulating material and having a circular rim 50 which fits over the frame 11 of the driving structure. The inner surface of the rear wall of the cap 50 is provided with two L-shaped recesses 53 in which are seated two metallic spring contact strips 51 having wavy formations.

The two supply leads of cord 52 enter the cap member 50 through a side aperture 50–1 and have inner ends stripped of insulation and electrically connected, respectively, to end portions of the two spring contact strips 51, as by soldering, for instance. An additional cap wall recess 54 is positioned between the two spring contact strip recesses 53 for entry of the third plug 42.

The cap contact recesses 53 and third terminal recess 54 are arranged so that when the cap 12 is placed over the terminal assembly 40 to be engaged thereby—in either one of two connecting positions displaced by 120°—one male plug 42 will enter recess opening 54 while the two other plugs 42 will enter the contact 51, recesses 53 and by deforming and flexing the free ends of the wavy spring contact strips 51 will establish therewith a good electrical connection and also a firm mechanical connection between the cap 50 and the driving structure 10. It can readily be seen due to the symmetrical positioning of the male plugs 42 of the cooperating cap socket contacts 52, that cap 12 can be detached from the earphone angularly displaced 120° in either direction, and attached in such displaced position. This arrangement provides a selective three position connection— one position for the right ear, one position for the left ear, and a third non-operative position—thus making it possible to angularly displace the entry of the cord lead 52 into the receiver cap 50 by 120° relatively to the eccentrically positioned sound outlet duct 14 of the earphone when it is placed within either the right or left ear.

Referring to Figs. 1A and 3A, this angle of about 120° represents the proper angular relationship between the cord leads 52 and the sound outlet duct 14 for the specific form of earphone disclosed herein so that the sound outlet duct 14 will lead directly into the ear canal of a person while the cord leads 52 will be positioned in the ear junction notch above the tragus of the ear whether the earphone is worn in the right or the left ear. If the wearer desires to place the earphone in the other ear, he need merely pull off the detachable cap 12, rotate it 120°, reconnect the cap 12 to the terminal assembly 40, and place it in the desired ear. Whether worn in the right or the left ear, the earphone will be deeply confined within the ear and the cord leads 52 will lay in their proper position in the ear junction notch above the tragus of the ear, thereby being substantially concealed.

According to another phase of the invention, the tiny earphone is detachably coupled to a special molded ear insert piece 60 conforming to the shape of the ear and provided with such an extremely shallow earphone coupling portion that when combined into a unitary structure with the earphone, the combined earphone assembly will substantially in its entirety be confined within the outer ear cavity without substantially projecting beyond the level of the ear helix.

As shown in Figs. 1 through 6, the ear insert 60 is formed of a substantially rigid one piece molded body having a female coupling portion 61 provided with a coupling connector, for instance of the snap fastener type, adapted for detachable mechanical connection with the sound outlet duct 14 of the earphone so as to form therewith a tight acoustic seal. The ear insert 60 has a relatively extended coupling surface 60–1 along which it faces and is held coupled to the similarly shaped outer surface of the cover wall 13 of the earphone. The ear insert 60 has an ear canal duct 62 extending from its female coupling portion 61 and adapted to fit directly into the ear canal 63 for passing the sound waves transmitted by sound outlet duct 14 of the earphone into the ear canal 63 of the user.

In addition to the ear canal duct 62, the ear insert 60 has also lateral insert formations 71, 72 having outer surfaces molded to fit the shape of the ear cavity portions engaged thereby and extending or branching off laterally and directly from the duct coupling portion 61 of the insert 60. The lateral insert formation 71 is shaped to underlie the tragus and antitragus and to fittingly engage and remain coupled to the underlying surface regions of the ear (Figs. 1, 2, 3). The adjoining lateral ear insert formation 72 is shaped to underlie, fit and engage the inner convolution surfaces of the outer ear formed by the concha and fossa 72–1, the anti-helix 75 and the helix 76 of the outer ear, as seen in Figs. 1, 2, 3. In other words, to render the cord leads 52 inconspicuous, the cord section 12 of the earphone is constructed so that the cord may be held in the ear junction notch above the tragus 74 of the ear (approximately 45° above the horizontal) and trained around the upper portion of the ear and down behind the anti-helix. By turning the selectively attachable cord coupling connector 120°, the cord 52 may be trained in the same way over the right or left ear, with the earphone comfortably seated deeply within either the right or left ear.

As shown in Figs. 1 through 3, when the earphone is coupled to the ear insert, as a result of the extreme shallowness of the ear insert 60 and the extreme miniature construction of the earphone, the combination of the ear insert 60 and the earphone is confined deeply within the inner cavity of the ear.

The features of the invention claimed herein are directed to an earphone having a rearward cord section with an eccentric cord junction and arranged for detachable coupling to the sound-emitting sections of the earphone in two angularly displaced positions thereof for making it possible to use the same earphone with either the right or the left ear of the user, with the supply cord of the earphone brought over the upper ear junction to the rear of the head in either one of the angularly displaced positions of its sound-emitting section. The co-pending application Serial No. 617,995, filed October 24, 1956, which is a division of the present application, claims other features of the invention directed to a transducing coil of an earphone or like acoustic device wherein the coil has a relatively stiff outwardly extending threading member carrying the two gossamer coil terminal leads for threading them through a perforation in a mounting structure of the coil carrying the coil terminals to which the ends of the gossamer coil leads are connected.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In an earphone, a sound generating section having a generally extended front wall including an eccentrically positioned sound outlet duct projecting therefrom and electrically energizable sound generating means under said front wall, a supply section having a rear wall and a flexible electric supply cord extending from an eccentrically positioned outer portion of said wall and having at least two relatively insulated conductor leads for supplying electric energy to said generating section, said two sections having each facing coupling surfaces and cooperating interfitting mechanical and electrical coupling elements through which said two sections may be detachably coupled to each other in at least two different angular positions displaced from each other in at least one direction by an angle smaller than 180°, in each of which they form an operative unit which generates sound when supplied with energy through said conductor leads.

2. In combination with an earphone as claimed in claim 1, an ear insert of relatively rigid material molded to conform and be sealed against the inner surfaces of the ear of the user for acoustically coupling said outlet duct to the ear canal of the user and form an acoustic seal therefor, said insert having a rearward coupling wall seated against said front wall and a female coupling recess portion formed in said coupling wall and substantially coaxial with said outlet duct for detachably receiving and establishing mechanical and acoustic coupling engagement with said outlet duct, said insert having a hollow duct arm extending generally frontward directly from said recess portion and shaped to fit and engage the ear canal of the user for transmitting the sound from the outlet duct to the ear canal, wall portions of said insert adjoining said recess portion and bordering said duct arm having an axial depth of the order of the depth of said recess.

3. In an earphone as claimed in claim 2, said generating section comprising a driving structure and a vibratory diaphragm driven by said driving structure for generating sound propagated through said outlet duct, said driving structure including coil windings having end lead portions connected to at least two of the coupling elements of said generating section.

4. In the combination as claimed in claim 2, said generating section comprising an electro-magnetic driving structure and a vibratory diaphragm driven by said driving structure for generating sound propagated through said outlet duct, said driving structure including coil windings having end lead portions connected to at least two of the coupling elements of said generating section.

5. In an earphone, a sound generating section having a generally circular front wall including an eccentrically positioned sound outlet duct projecting therefrom and electrically energizable sound generating means under said front wall, a supply section having a rear wall and a flexible electric supply cord extending from an eccentrically positioned outer portion of said wall and having at least two relatively insulated conductor leads for supplying electric energy to said generating section, said two sections each having facing coupling surfaces and cooperating interfitting mechanical and electrical coupling means through which said two sections may be detachably coupled to each other in at least two different angular positions displaced from each other in at least one direction by an angle smaller than 180°, in each of which positions they form an operative unit which generates sound when supplied with energy through said conductor leads, said cooperating interfitting mechanical and electrical coupling means comprising three symmetrically arranged relatively displaced coupling elements on said generating section and two coupling elements on said supply section arranged for cooperation with either one set of two of said three coupling elements or with another set of two of said three coupling elements of said generating section when said two sections are coupled either in one or in the other of said two angularly displaced coupling positions.

6. In an earphone as claimed in claim 5, said generating section comprising an electro-magnetic driving structure and a vibratory diaphragm driven by said driving structure for generating sound propagated through said outlet duct, said driving structure including coil windings having end lead portions connected to at least two of the coupling elements of said generating section.

References Cited in the file of this patent

UNITED STATES PATENTS

| 1,576,938 | Struxiano | Mar. 16, 1926 |
| 1,668,910 | Jones | May 8, 1928 |
| 1,893,474 | Lieber | Jan. 3, 1933 |
| 2,261,979 | Domizi | Nov. 11, 1941 |
| 2,284,462 | Williams | May 26, 1942 |
| 2,325,590 | Carlisle et al. | Aug. 3, 1943 |
| 2,344,023 | Carlisle et al. | Mar. 14, 1944 |
| 2,390,243 | Faltico | Dec. 4, 1945 |
| 2,493,734 | Pearson | Jan. 3, 1950 |
| 2,506,490 | Coley | May 2, 1950 |
| 2,521,414 | Schier | Sept. 5, 1950 |
| 2,582,287 | Shaper | Jan. 15, 1952 |

FOREIGN PATENTS

| 289,719 | Great Britain | May 3, 1928 |